US012368245B2

(12) United States Patent
Tao et al.

(10) Patent No.: US 12,368,245 B2
(45) Date of Patent: Jul. 22, 2025

(54) ANTENNA ASSEMBLY AND WIRELESS DEVICE

(71) Applicant: Huawei Technologies Co., Ltd., Shenzhen (CN)

(72) Inventors: Zui Tao, Nanjing (CN); Xiao Zhou, Shanghai (CN); Jie Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 17/723,972

(22) Filed: Apr. 19, 2022

(65) Prior Publication Data

US 2022/0247088 A1 Aug. 4, 2022

Related U.S. Application Data

(63) Continuation of application No. PCT/CN2020/088783, filed on May 6, 2020.

(30) Foreign Application Priority Data

Oct. 22, 2019 (CN) ......................... 201911005244.8

(51) Int. Cl.

*H01Q 21/00* (2006.01)
*H01Q 1/22* (2006.01)
*H01Q 9/16* (2006.01)
*H01Q 21/20* (2006.01)

(52) U.S. Cl.

CPC ....... *H01Q 21/0075* (2013.01); *H01Q 1/2291* (2013.01); *H01Q 9/16* (2013.01); *H01Q 21/205* (2013.01)

(58) Field of Classification Search

CPC .......... H01Q 9/065; H01Q 9/16; H01Q 21/26; H01Q 21/205; H01Q 3/24; H01Q 9/285; H01P 3/08; H01P 3/081–088

See application file for complete search history.

(56) References Cited

U.S. PATENT DOCUMENTS

| | | | |
|---|---|---|---|
| 4,672,386 | A | 6/1987 | Wood |
| 6,147,657 | A | 11/2000 | Hildebrand et al. |
| 8,009,112 | B2 | 8/2011 | Buer et al. |
| 9,478,865 | B1 | 10/2016 | Willis et al. |
| 2003/0218571 | A1 | 11/2003 | Yoon et al. |
| 2005/0099356 | A1 | 5/2005 | Durham et al. |
| 2012/0276854 | A1 | 11/2012 | Joshi et al. |

(Continued)

FOREIGN PATENT DOCUMENTS

| | | | |
|---|---|---|---|
| CN | 2836258 | Y | 11/2006 |
| CN | 101997170 | A | 3/2011 |

(Continued)

*Primary Examiner* — Dameon E Levi
*Assistant Examiner* — Aladdin Abdulbaki
(74) *Attorney, Agent, or Firm* — Conley Rose, P.C.

(57) ABSTRACT

An antenna assembly includes N elements, a feeding network, and a printed circuit board (PCB). N is an integer greater than or equal to 3. The N elements and the feeding network are located on the PCB. The N elements are all connected to the feeding network, each element has a radial part, the radial part of each element points to an antenna phase center, and a length of the radial part of each element is greater than a sum of lengths of other non-radial parts.

20 Claims, 6 Drawing Sheets

(56) References Cited

U.S. PATENT DOCUMENTS

| | | | | |
|---|---|---|---|---|
| 2014/0232572 | A1 | 8/2014 | Sharawi et al. | |
| 2016/0020511 | A1* | 1/2016 | Liao | H01Q 1/38 343/860 |
| 2019/0245278 | A1* | 8/2019 | Hsieh | H01Q 1/521 |

FOREIGN PATENT DOCUMENTS

| | | | |
|---|---|---|---|
| CN | 102122763 | A | 7/2011 |
| CN | 103151602 | A | 6/2013 |
| CN | 104157980 | A | 11/2014 |
| CN | 205565000 | U | 9/2016 |
| CN | 106410397 | A | 2/2017 |
| CN | 106549233 | A | 3/2017 |
| CN | 106785405 | A | 5/2017 |
| CN | 107240766 | A | 10/2017 |
| CN | 107240783 | A | 10/2017 |
| CN | 208014903 | U | 10/2018 |
| CN | 110085966 | A | 8/2019 |

* cited by examiner

ANTENNA ASSEMBLY AND WIRELESS DEVICE

CROSS-REFERENCE TO RELATED APPLICATIONS

This is a continuation of International Patent Application No. PCT/CN2020/088783 filed on May 6, 2020, which claims priority to Chinese Patent Application No. 201911005244.8 filed on Oct. 22, 2019. The disclosures of the aforementioned applications are hereby incorporated by reference in their entireties.

TECHNICAL FIELD

This disclosure relates to the field of communication technologies, and in particular, to an antenna assembly and a wireless device.

BACKGROUND

A wireless access point (AP) may provide large signal coverage by using an omnidirectional antenna, to meet a communication capacity requirement. However, when a distance between wireless APs operating at a same frequency is small, signals of adjacent wireless APs operating at a same frequency may interfere with each other, resulting in deterioration of communication quality. An interference suppression capability of an entire network depends on a side lobe suppression capability of the omnidirectional antenna.

The omnidirectional antenna mainly includes a dipole antenna, a monopole antenna, a slot antenna, and the like. For example, the dipole antenna usually approximates a point source, and has a wide beamwidth and a weak side lobe suppression capability.

SUMMARY

This disclosure provides an antenna assembly and a wireless device, to resolve a problem that an omnidirectional antenna has a weak side lobe suppression capability. Technical solutions are as follows.

According to a first aspect, an antenna assembly is provided. The antenna assembly includes N elements, a feeding network, and a printed circuit board (PCB). N is an integer greater than or equal to 3. The N elements and the feeding network are located on the PCB. The N elements are all connected to the feeding network. Each element has a radial part. The radial part of each element points to an antenna phase center, and a length of the radial part of each element is greater than a sum of lengths of other non-radial parts.

In this disclosure, the length of the radial part of each element is greater than the sum of the lengths of the other non-radial parts. In this case, radiation intensity of an electromagnetic field, of each element, in a direction in which the radial part is located is greater than radiation intensity on a non-radial part, so that a main radiation direction of each element is consistent with the direction in which the radial part is located. Therefore, each element 301 is equivalent to a line source, and has a relatively narrow beamwidth and an enhanced side lobe suppression capability.

Optionally, N is an even number, there are a plurality of element pairs in the N elements, and the elements in each element pair are centrosymmetrical with each other with respect to the antenna phase center.

Optionally, a distance between the two elements in each element pair is a preset multiple of an operating wavelength of the antenna assembly.

Optionally, the present multiple is any value from 0.25 to 1.

When N is an even number, N dipole elements may be divided into a plurality of dipole element pairs, and the two elements in each element pair are centrosymmetrical with each other with respect to the antenna phase center. In this way, when the antenna assembly is designed, a distance between two elements may be set based on a use scenario, so that radiation intensity of the antenna assembly at different radiation angles is adjusted, to further adjust a side lobe suppression capability of the antenna assembly.

Optionally, the feeding network is a double-sided parallel strip line (DSPSL) power division network. The N elements are N dipole elements. Each dipole element includes two arms. One of the two arms is located on an upper surface of the PCB and is connected to one end of an arc-shaped strip line that is located on the upper surface of the PCB and that is in the double-sided parallel strip line power division network. The other arm is located on a lower surface of the PCB and is connected to one end of an arc-shaped strip line that is located on the lower surface of the PCB and that is in the double-sided parallel strip line power division network. The arc-shaped strip lines connected to the two arms are mirror-symmetrical with each other with respect to the PCB, and connection points between the two arms and the arc-shaped strip lines are mirror-symmetrical with each other with respect to the PCB.

Optionally, the double-sided parallel strip line power division network includes an upper surface network and a lower surface network. The upper surface network is located on the upper surface of the PCB, and the lower surface network is located on the lower surface of the PCB. The upper surface network and the lower surface network are mirror-symmetrical with each other with respect to the PCB. The upper surface network and the lower surface network each include a first power splitter, a plurality of linear strip lines, a plurality of impedance transformation lines, a second power splitter, and a plurality of arc-shaped strip lines. The first power splitter is configured to connect the plurality of linear strip lines and the plurality of arc-shaped strip lines. Each of the plurality of linear strip lines is connected to one of the plurality of impedance transformation lines. The second power splitter is configured to connect the plurality of impedance transformation lines.

Optionally, a length of each of the two arms is a specified multiple of an operating wavelength of the antenna assembly.

Optionally, the specified multiple is any value from 0.125 to 1.

Optionally, a first arm in the two arms includes a non-radial part, the first arm is L-shaped, a second arm does not include a non-radial part, and a distance between the first arm and the antenna phase center is greater than a distance between the second arm and the antenna phase center. In the foregoing structure, one arm, away from the antenna phase center, in the two arms of each dipole element may be L-shaped, and the other arm may not include a non-radial part. In this way, an area occupied by the feeding network and the dipole element may be reduced, so that an antenna size is reduced.

Optionally, a distance between a first dipole element and a second dipole element that are centrosymmetrical with each other in the N dipole elements refers to a distance between a first connection point and a second connection point, the first connection point is a connection point between the first dipole element and the arc-shaped strip line, and the second connection point is a connection point between the second dipole element and the arc-shaped strip line.

Optionally, the feeding network is a strip line power division network, and the N elements are N monopole elements. The strip line power division network and the N monopole elements are located on an upper surface of the PCB. Each monopole element is connected to one end of an arc-shaped strip line in the strip line power division network.

Optionally, the feeding network is a strip line power division network, and the strip line power division network is located on a lower surface of the PCB. The N elements are N slot elements. The N slot elements refer to N slots on an upper surface of the PCB, and each slot element is connected to one end of an arc-shaped strip line in the strip line power division network.

According to a second aspect, a wireless device is provided. The wireless device includes a baseband circuit, a radio frequency circuit, and the antenna assembly described in the first aspect. The radio frequency circuit is configured to work with the antenna assembly to implement transmission and reception of a radio signal, and the baseband circuit is configured to process the radio signal.

Technical effects achieved in the second aspect are similar to technical effects achieved by the corresponding technical means in the first aspect, and details are not described herein again.

DESCRIPTION OF EMBODIMENTS

Figure 1:
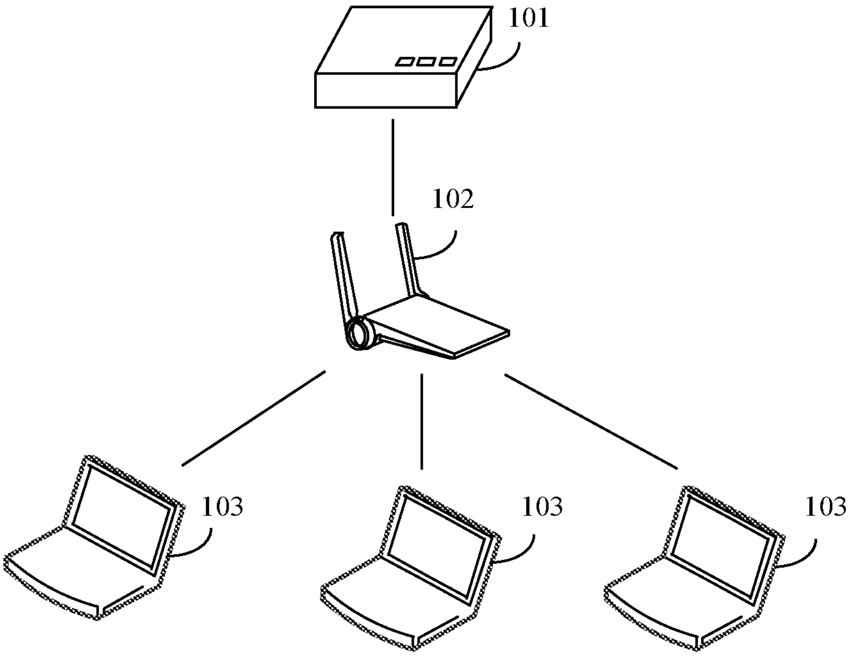
FIG. 1 is a diagram of an application scenario of an antenna assembly according to an embodiment of this disclosure.

FIG. 1 is a diagram of an application scenario of an antenna assembly according to an embodiment of this disclosure. As shown in FIG. 1, the scenario includes a controller 101, an AP 102, and a plurality of terminals 103.

The controller 101 may be configured to manage and configure a plurality of APs 102 in a centralized manner, and forward user data. An AP is used to provide a wireless access service for the plurality of terminals 103 that are connected.

In a high-density deployment scenario, the AP is usually disposed at a height of 3 to 5 meters (m), and has a cell covering radius reaching 5 to 8 m. In this scenario, a quantity of users per unit area is usually large. Therefore, a large-angle omnidirectional antenna may be used in the AP for signal coverage, to ensure communication capacity. However, since a quantity of channels is limited, a distance between APs operating at a same frequency is usually small. In this case, there is signal interference between the APs operating at the same frequency. Based on this, this embodiment of this disclosure provides an antenna assembly used in an AP, to improve an interference suppression capability of the AP. Therefore, signal interference between APs operating at a same frequency is reduced.

The AP 102 may be a network device, for example, a base station, a router, or a switch, and the plurality of terminals 103 may be mobile phones, computers, or the like. In addition, in FIG. 1, only three terminals are used as an example for description, and this does not constitute a limitation on a quantity of terminals in the application scenario provided in this embodiment of this disclosure.

Figure 2:
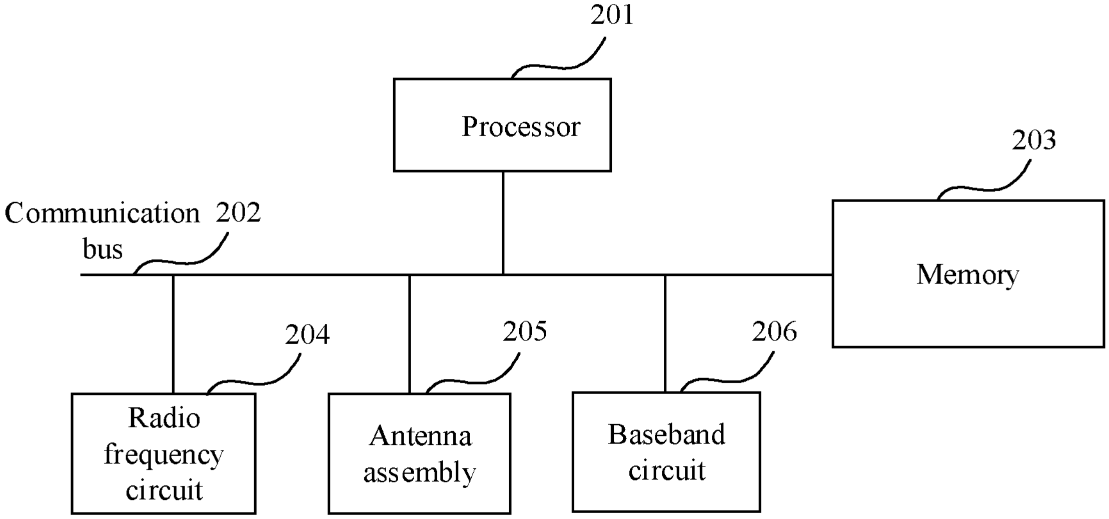
FIG. 2 is a schematic diagram of a structure of a network device according to an embodiment of this disclosure.

FIG. 2 is a schematic diagram of a structure of a network device according to an embodiment of this disclosure. In an example, the AP in FIG. 1 may be implemented by a network device shown in FIG. 2. As shown in FIG. 2, the network device includes a processor 201, a communication bus 202, a memory 203, a radio frequency circuit 204, an antenna assembly 205, and a baseband circuit 206.

The processor 201 may be a common central processing unit (CPU), a microprocessor, an application-specific integrated circuit (ASIC), or one or more integrated circuits.

The communication bus 202 may include a channel for transmitting information between the foregoing components.

The memory 203 may be a read-only memory (ROM), another type of static storage device that can store static information and instructions, a random-access memory (RAM), another type of dynamic storage device that can store information and instructions, an electrically erasable programmable read-only memory (EEPROM), an optical disc, a magnetic disk, another magnetic storage device, or any other media capable of carrying or storing desired program code in the form of an instruction or a data structure and capable of being accessed by a computer. The memory 203 may exist independently and is connected to the processor 201. The memory 203 may alternatively be integrated with the processor 201.

The radio frequency circuit 204 works with the antenna assembly 205 to implement transmission and reception of a radio signal. The antenna assembly 205 is the antenna assembly provided in this embodiment of this disclosure. For a structure of the antenna assembly, refer to related description in subsequent embodiments.

The baseband circuit 206 is configured to process a received radio signal or a to-be-sent radio signal.

In a specific implementation, in an embodiment, the processor 201 may include one or more CPUs.

In a specific implementation, in an embodiment, the network device may further include an output device (not shown in the figure) and an input device (not shown in the figure). The output device communicates with the processor 201, and may display information in a plurality of manners. For example, the output device may be a liquid-crystal display (LCD), a light-emitting diode (LED) display device, a cathode-ray tube (CRT) display device, a projector, or the like. The input device communicates with the processor 201, and may receive input from a user in a plurality of manners. For example, the input device may be a mouse, a keyboard, a touchscreen, a sensor, or the like.

Next, the antenna assembly provided in this embodiment of this disclosure is described.

Figure 3:
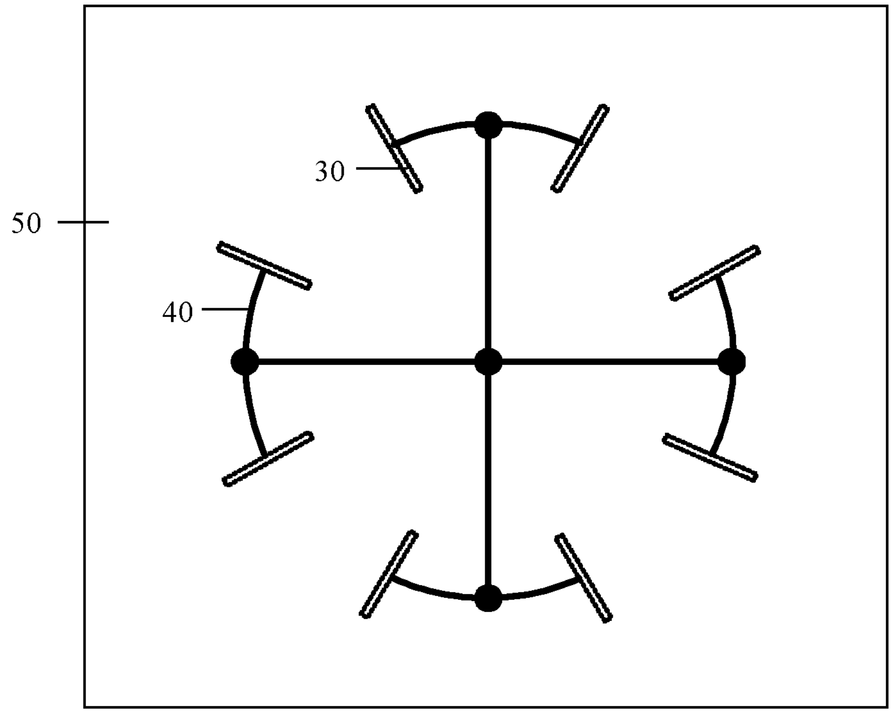
FIG. 3 is a schematic diagram of a structure of an antenna assembly according to an embodiment of this disclosure.

FIG. 3 is a schematic diagram of a structure of an antenna assembly according to an embodiment of this disclosure. As shown in FIG. 3, the antenna assembly may include N elements 30, a feeding network 40, and a PCB 50, where N is an integer greater than or equal to 3. The N elements 30 and the feeding network 40 are located on the PCB 50, the N elements 30 are all connected to the feeding network 40, each element 30 has a radial part, the radial part of each element 30 points to an antenna phase center, and a length of the radial part of each element is greater than a sum of lengths of other non-radial parts. N may be an even number or an odd number. For example, N may be 3, or 4, or another value. A side lobe suppression capability of the antenna assembly is stronger when N is 4 than that when N is equal to 3. In FIG. 3, that N is 8 is used as an example for description, but this does not constitute a limitation on a quantity of the elements 30 included in the antenna assembly.

After an electromagnetic wave radiated from each element is a distance away from the element, an equiphase surface of the electromagnetic wave approximates a spherical surface, and a spherical center of the spherical surface is the antenna phase center. In this embodiment of this disclosure, each element 30 has a radial part pointing to the antenna phase center. In a possible case, each element 30 may not include other non-radial parts, that is, each element 30 is linear and points to the antenna phase center. Optionally, in another possible case, each element 30 has a radial part pointing to the antenna phase center, and one or more other non-radial parts not pointing to the antenna phase center, and a sum of lengths of all non-radial parts not pointing to the antenna phase center is less than a length of the radial part included in each element 30. In this way, radiation intensity of an electromagnetic field, of each element, in a direction in which the radial part is located is greater than radiation intensity on a non-radial part, that is, a main radiation direction of each element is consistent with the direction in which the radial part is located. Therefore, each element 30 is equivalent to a line source, and has a relatively narrow beamwidth and an enhanced side lobe suppression capability. Each part of the element 30 may be linear or may have a width. A direction of one part of the element 30 refers to a direction of a major axis of the part. For example, in FIG. 3, the element 30 has a width, and that the element is located in a radial direction means that a length direction of the element is in the radial direction. The width of the element 30 is not necessarily the same at different parts, provided that the width is generally smaller than the length and the length direction is in the radial direction.

In addition, as shown in FIG. 3, the N elements 30 may be distributed and arranged on a circumference centering on the antenna phase center. Optionally, the elements 30 may be arranged at equal intervals on the circumference. To be specific, an included angle between lines connecting two adjacent elements 30 to the antenna phase center is 360/N degrees. When N is an even number, the N element pairs 30 may include a plurality of element pairs, and the two elements 30 in each element pair are centrosymmetrical with each other with respect to the antenna phase center. For example, when N is 8, the included angle between the lines connecting the two adjacent elements 30 to the antenna phase center is 45 degrees. Eight elements 30 may be divided into four element pairs, and the two elements 30 in each element pair are centrosymmetrical with each other with respect to the antenna phase center. Certainly, the element 30 may alternatively be arranged at unequal intervals. For example, it is assumed that an included angle between lines connecting two adjacent elements that are connected to both ends of a same transmission line in the feeding network 40 to the antenna phase center is a first included angle, an included angle between lines connecting two adjacent elements that are connected to different transmission lines to the antenna phase center is a second included angle, and the first included angle may be different from the second included angle.

In addition, the N elements 30 and the feeding network 40 may be printed on a surface of the PCB 50, and the feeding network 40 and the N elements 30 may be located on an upper surface of the PCB 50 or a lower surface of the PCB 50 depending on differences of the feeding network 40 and of the N elements 30.

The elements in the antenna assembly may be dipole elements, monopole elements, or slot elements. If the elements are different, the feeding network is different. Next, antenna assemblies including different elements and different feeding networks are described separately.

Figure 4:
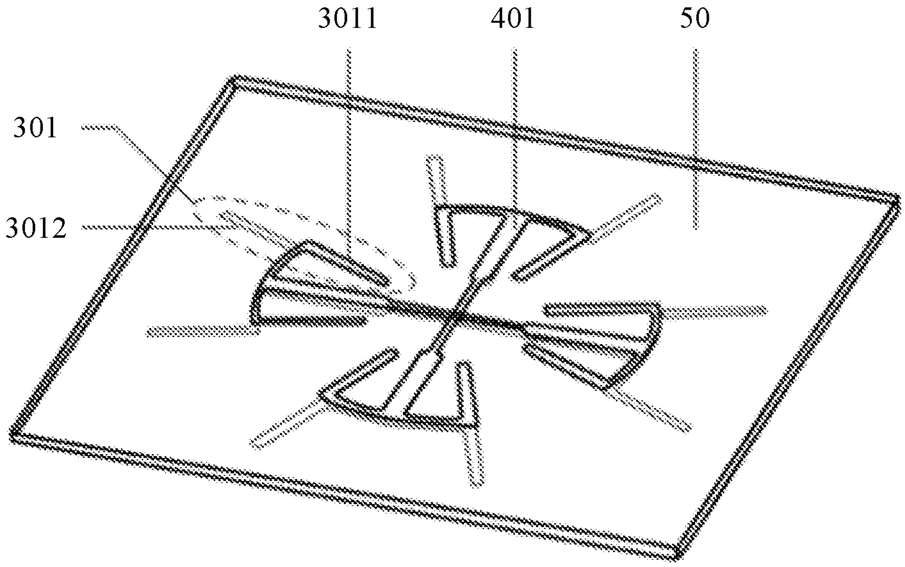
FIG. 4 is a schematic diagram of a structure of an antenna assembly that includes a dipole element according to an embodiment of this disclosure.

When the elements included in the antenna assembly are dipole elements 301, the feeding network 40 may be a double-sided parallel strip line power division network 401. As shown in FIG. 4, each dipole element 301 includes two arms. One arm 3011 in the two arms is located on the upper surface of the PCB 50 and is connected to one end of an arc-shaped strip line that is located on the upper surface of the PCB 50 and that is in the double-sided parallel strip line power division network 401, the other arm 3012 is located on the lower surface of the PCB 50 and is connected to one end of an arc-shaped strip line that is located on the lower surface of the PCB 50 and that is in the double-sided parallel strip line power division network, the arc-shaped strip lines connected to the two arms are mirror-symmetrical with each other with respect to the PCB 50, and connection points between the two arms and the arc-shaped strip lines are mirror-symmetrical with each other with respect to the PCB 50.

The double-sided parallel strip line power division network 401 includes an upper surface network and a lower surface network. The upper surface network is located on the upper surface of the PCB 50, the lower surface network is located on the lower surface of the PCB 50, and the upper surface network and the lower surface network are mirror-symmetrical with each other with respect to a board of the PCB 50.

Figure 5:
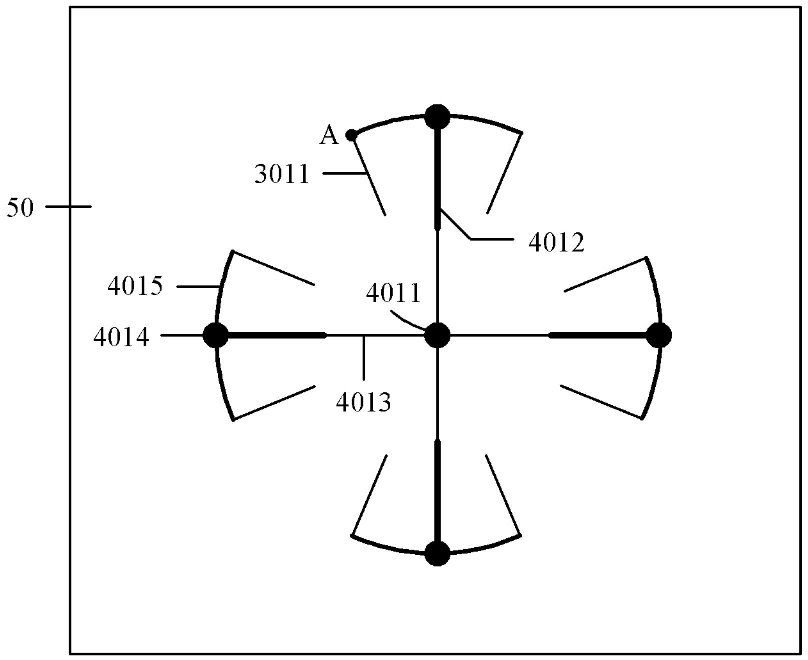
FIG. 5 is a schematic diagram of a structure of an upper surface of a PCB of an antenna assembly that includes a dipole element according to an embodiment of this disclosure.

FIG. 5 is a schematic diagram of an upper surface network located on the upper surface of the PCB 50 when N is an even number. As shown in FIG. 5, the upper surface network may include a first power splitter 4011, a plurality of linear strip lines 4012, a plurality of impedance transformation lines 4013, a second power splitter 4014, and a plurality of arc-shaped strip lines 4015. The second power splitter 4014 may be a one-to-two power splitter, and the first power splitter 4011 may be selected based on a quantity of elements. For example, as shown in FIG. 5, the quantity of elements is 8; when the second power splitter 4014 is a one-to-two power splitter, the first power splitter may be a one-to-four power splitter. In this case, from a feed point of the feeding network, eight feed lines may be led out through the first power splitter 4011 and the second power splitter 4014, to feed the eight elements respectively. The first power splitter 4011 of the feeding network may be located at the antenna phase center. In addition, as shown in FIG. 5, a circumference corresponding to the feeding network may be determined by using a sum of lengths of the impedance transformation lines 4013 and the linear strip lines 4012 as a radius and using a position of the first power splitter 4011 as a center. The arc-shaped strip lines 4015 may be distributed along the circumference. A connection point between a dipole element and an arc-shaped strip line may be located on the circumference, that is, N dipole elements are distributed on the circumference centering on the antenna phase center.

For example, as shown in FIG. 5, four output ports of the first power splitter 4011 may be connected to four impedance transformation lines 4013, the other end of each impedance transformation line 4013 is connected to one end of one linear strip line 4012, and impedance matching between the linear strip lines 4012 and the first power splitter 4011 may be implemented through the impedance transformation lines 4013. The second power splitter 4014 is connected to the other end of each linear strip line 4012. Two output ports of the second power splitter 4014 are respectively connected to an arc-shaped strip line 4015, and one end of each arc-shaped strip line 4015 may be connected to an arm 3011 of a dipole element 301. In this way, after the first power splitter 4011 splits one current input to the feeding network into four currents, the first power splitter may output the four currents through the four output ports, and the four currents are respectively transmitted to four second power splitters 4014 through four impedance transformation lines 4013 and four linear strip lines 4012 connected to the four impedance transformation lines 4013. Each second power splitter 4014 may split a received current into two currents and output the two currents through two output ports, and the two currents are respectively transmitted to arms of two adjacent dipole elements 301 through two arc-shaped strip lines 4015, to feed the two adjacent dipole elements 301.

Each of eight dipole elements 301 has two arms. An arm 3011 in the two arms, which is located in the circumference corresponding to the feeding network, is located on the upper surface and is connected to one end of one arc-shaped strip line 4015 in the upper surface network. A length of each arm may be a specified multiple of an operating wavelength of the antenna assembly. The specified multiple may be any value from 0.125 to 1.

The impedance transformation lines 4013 may be quarter-wave impedance transformation lines, and the linear strip lines 4012 and the arc-shaped strip lines 4015 may be 50 ohm strip lines.

Figure 6:
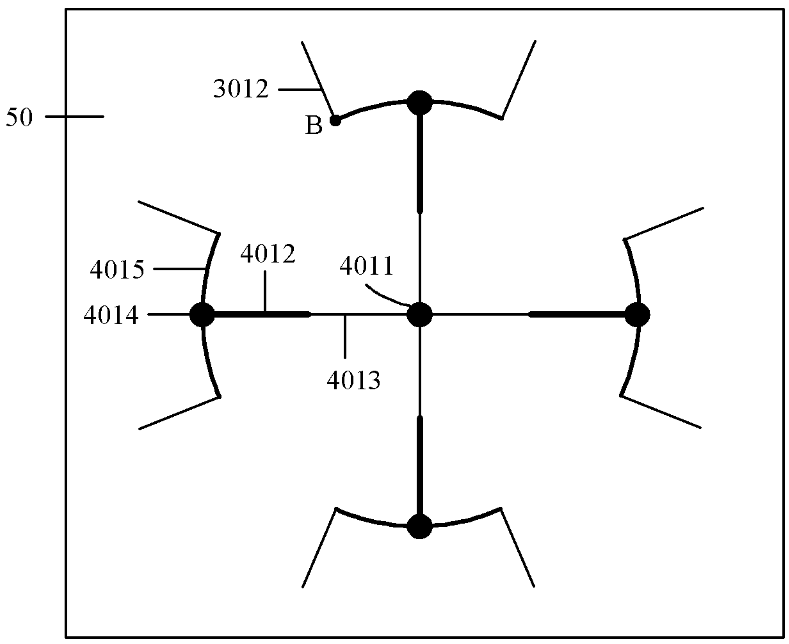
FIG. 6 is a schematic diagram of a structure of a lower surface of a PCB of an antenna assembly that includes a dipole element according to an embodiment of this disclosure.

FIG. 6 shows a lower surface network that is mirror-symmetrical with the upper surface network in FIG. 5. As shown in FIG. 6, the lower surface network also includes a first power splitter 4011, a plurality of linear strip lines 4012, a plurality of impedance transformation lines 4013, a second power splitter 4014, and a plurality of arc-shaped strip lines 4015. A structure of the lower surface network is the same as that of the upper surface network, and the lower surface network is located on the lower surface of the PCB 50 and is mirror-symmetrical with the upper surface network with respect to the PCB 50. For descriptions of components in the lower surface network, refer to related descriptions of the upper surface network in FIG. 5. Details are not described herein again in this embodiment of this disclosure.

In addition, the arm 3012 that is located outside the circumference corresponding to the feeding network and that is in the two arms of each of the eight dipole elements 301 is located on the lower surface of the PCB 50 and is connected to one end of one arc-shaped strip line 4015 in the lower surface network. In this way, the arms 3011 and 3012 that are respectively connected to two arc-shaped strip lines that are mirror-symmetrical with each other constitute a dipole element. As shown in FIG. 5 and FIG. 6, the arm 3011 in FIG. 5 and the arm 3012 in FIG. 6 are two arms of one dipole element. The upper surface network and the lower surface network are mirror-symmetrical with each other, and the arc-shaped strip line 4015 connected to one arm 3011 in two arms of a same element and the arc-shaped strip line 4015 connected to the other arm 3012 are also mirror-symmetrical. Correspondingly, connection points A and B of the two arms and the arc-shaped strip line are also mirror-symmetrical.

When N is an even number, the N dipole elements 301 may be divided into N/2 dipole element pairs. The two dipole elements in each dipole element pair may be centrosymmetrical with each other with respect to the antenna phase center. If two dipole elements that are radially symmetrical with each other are equivalent to a point source with an amplitude of 1 and a phase of 0, a function of radiation intensity F changing with a radiation angle θ may be determined by the following formula (1).

$$F(\theta) = e^\wedge(-jkh\sin\theta)\ (e^\wedge(-j0.5ka\cos\theta) - e^\wedge j0.5ka\cos\theta) - e^\wedge jkh\sin\theta\ (e^\wedge(-j0.5ka\cos\theta) - e^\wedge j0.5ka\cos\theta) \quad (1)$$

In the formula, θ is a pitch angle, k is a propagation constant of an electromagnetic wave, h is a distance between a PCB and a metal base plate located below the PCB, and a is a distance between the two dipole elements in a dipole element pair.

It can be learned from the foregoing function relationship that a distance between the two dipole elements in a dipole element pair is adjusted, so that radiation intensity of the dipole element pair at different radiation angles may be adjusted, to adjust side lobe suppression capability of the antenna assembly. Based on this, in this embodiment of this disclosure, a distance between the two dipole elements in each dipole element pair that is included in the antenna assembly may be set based on a radiation angle of the dipole element pair and a required side lobe suppression capability. For example, the distance between the two dipole elements in each dipole element pair may be a preset multiple of the operating wavelength of the antenna assembly. The preset multiple may be any value from 0.25 to 1.

In this embodiment of this disclosure, in the two dipole elements that are centrosymmetrical with each other in a dipole element pair, for convenience of description, one is referred to as a first dipole element and the other is referred to as a second dipole element. In this way, a distance between the first dipole element and the second dipole element may be a distance between a first connection point and a second connection point. The first connection point refers to a connection point between the first dipole element and the arc-shaped transmission line, and the second connection point refers to a connection point between the second dipole element and an arc-shaped strip line. That is, as shown in FIG. 5 and FIG. 6, a distance between point A and point B is a distance between two dipole elements that are centrosymmetrical.

In FIG. 5 and FIG. 6, that N is 8 is used as an example for description. For other cases in which N is an even number, refer to the foregoing examples. A difference is that when N is a different even number, the first power splitters included in the upper surface network and the lower surface network are different, and quantities of the impedance transformation lines and the strip lines included in the feeding network are also different. For example, when N is 6, the first power splitter in the upper surface network and the lower surface network may be a one-to-three power splitter. Correspondingly, the first power splitter may be connected to three impedance transformation lines, the three impedance transformation lines are connected to three linear strip lines, each linear strip line is connected to one one-to-two second power splitter, and each second power splitter may be connected to two arc-shaped strip lines.

Figure 7:
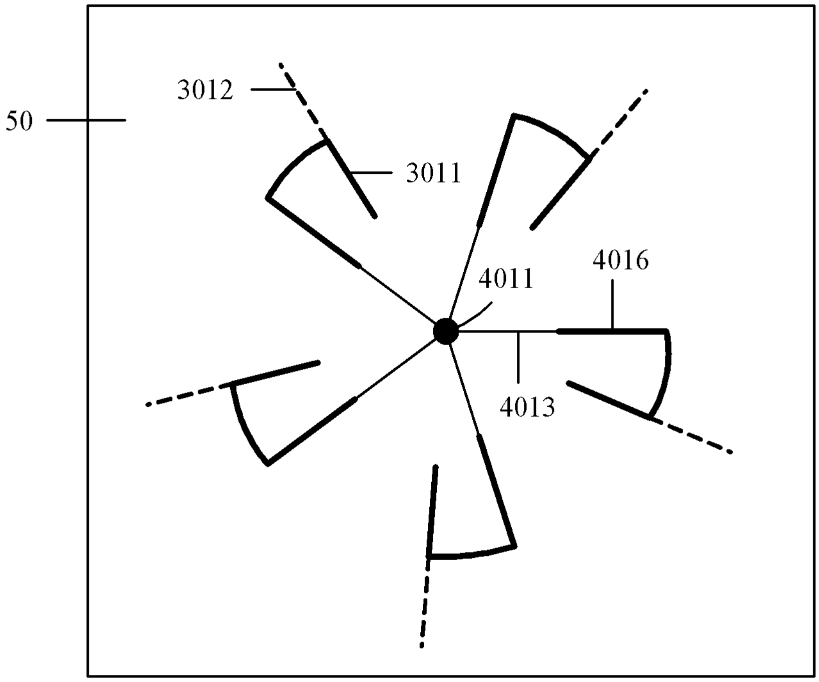
FIG. 7 is a schematic diagram of a structure of an upper surface of a PCB of an antenna assembly that includes an odd number of dipole elements according to an embodiment of this disclosure.

The foregoing describes a structure of the antenna assembly when the elements are dipole elements, the feeding network is a double-sided parallel strip line power division network, and N is an even number. When N is an odd number, as shown in FIG. 7, the upper surface network located on the upper surface of the PCB 50 may include a first power splitter 4011, a plurality of impedance transformation lines 4013, and a plurality of arc-form strip lines 4016. As shown in FIG. 7, for example, N is 5. The first power splitter 4011 may be a one-to-five power splitter, the first power splitter 4011 may be connected to five impedance transformation lines 4013, the other end of each impedance transformation line 4013 is connected to arc-form strip line 4016, the arc-form strip line 4016 may be a strip line having an arc-shaped tail end as shown in FIG. 7, and the tail end of each arc-form strip line 4016 may be connected to one arm 3011 of two arms in a dipole element 301. Correspondingly, a structure of the lower surface network located on the lower surface of the PCB 50 is the same as that of the upper surface network, the lower surface network and the upper surface network are mirror-symmetrical with each other with respect to the PCB 50, and the other arm 3012 in the two arms in each dipole element 301 is connected to one end of one strip line in the lower surface network. The strip lines connected to the two arms of the dipole element are mirror-symmetrical with each other with respect to the PCB 50, so that connection points between the two arms and the strip lines are mirror-symmetrical with each other with respect to the PCB 50.

In the foregoing embodiment, the strip lines connected to the dipole element may not be arc-shaped strip lines but linear strip lines, and in this case, the linear strip lines may be tangent to the circumference corresponding to the feeding network.

Optionally, in this embodiment of this disclosure, to reduce an area occupied by the feeding network and the dipole elements, the two arms of each dipole element may be different in lengths and shapes. For example, when the two arms of the dipole element are linear and point to the antenna phase center, a length of the arm that is located outside the circumference corresponding to the feeding network and that is in the two arms may be smaller than a length of the other arm. Alternatively, the arm that is located within the circumference corresponding to the feeding network and that is in the two arms of the dipole element may be linear and point to the antenna phase center, and the other arm located outside the circumference corresponding to the feeding network may include a radial part and a non-radial part, for example, the tail end of the arm may be bent. The radial part is connected to an arc-shaped strip line, so that the radial part of the arm and another linear arm constitute a radial part of the dipole element. A length of the bent non-radial part is less than a sum of lengths of the radial part of the arm and the other arm. For example, the arm located outside the circumference corresponding to the feeding network may be L-shaped. This is not limited in this embodiment of this disclosure.

Figure 8:
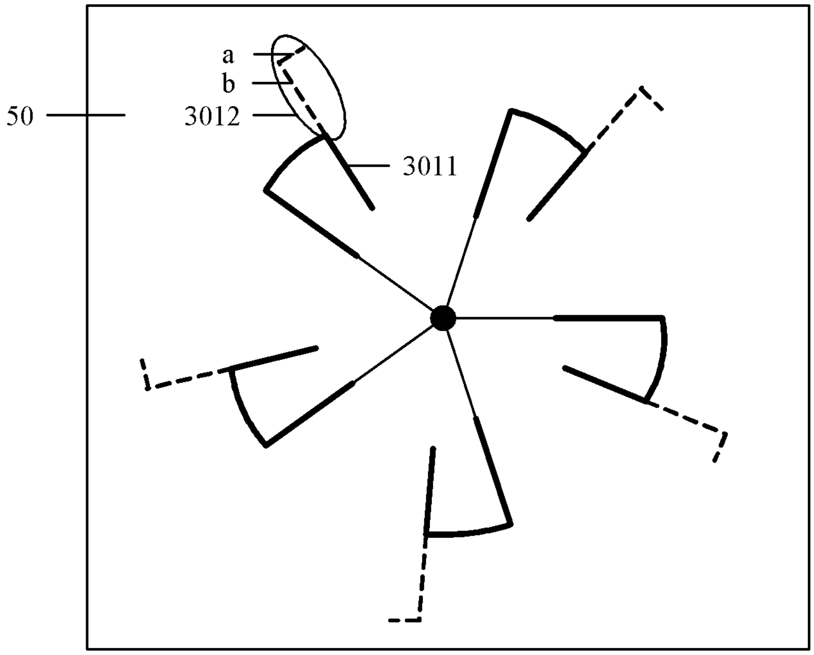
FIG. 8 is a schematic diagram of an antenna assembly of which one arm of a dipole element is L-shaped according to an embodiment of this disclosure.

For example, FIG. 8 is a schematic diagram of an antenna assembly of which one arm of a dipole element is L-shaped. As shown in FIG. 8, an arm 3011 is located within a circumference of the feeding network, and the arm 3011 may be linear and point to the antenna phase center. An arm 3012 is located outside the circumference corresponding to the feeding network, and the arm 3012 is L-shaped. The arm 3012 includes a radial part a and a non-radial part b, and the arm 3012 is connected to an arc-shaped strip line through the radial part a, so that the radial part a and the arm 3011 constitute a radial part of the dipole element. A length of the non-radial part b is less than a sum of lengths of the radial part a and the arm 3011.

FIG. 8 is merely a possible implementation of the dipole element provided in this embodiment of this disclosure. In some other possible implementations, the arm located outside the circumference corresponding to the feeding network may be in another shape, and the arm located within the circumference corresponding to the feeding network may also be in another shape provided that a length of the radial part of the dipole element is greater than a sum of lengths of other non-radial parts.

In this embodiment of this disclosure, the N elements and the feeding network are located on the PCB, the N elements are all connected to the feeding network, each element has a radial part, the radial part of each element points to the antenna phase center, and a length of the radial part of each element is greater than a sum of lengths of other non-radial parts. In this way, radiation intensity of an electromagnetic field, of each element, in a direction in which the radial part is located is greater than radiation intensity on a non-radial part, that is, a main radiation direction of each element is consistent with the direction in which the radial part is located. Therefore, each element is equivalent to a line source, and has a relatively narrow beamwidth and an enhanced side lobe suppression capability. In this case, signal interference is reduced for two adjacent wireless APs operating at a same frequency. In addition, when N is an even number, the N dipole elements may be divided into a plurality of dipole element pairs, and the two elements in each element pair are centrosymmetrical with each other with respect to the antenna phase center. In this way, when the antenna assembly is designed, a distance between two elements may be set based on a use scenario, so that radiation intensity of the antenna assembly at different radiation angles is adjusted, to further adjust a side lobe suppression capability of the antenna assembly.

In FIG. 4 to FIG. 8, an implementation of the antenna assembly when the elements in the antenna assembly are dipole elements is mainly described. Optionally, in this embodiment of this disclosure, the N elements included in the antenna assembly may be all monopole elements, and in this case, the feeding network may be a strip line power division network.

Figure 9:
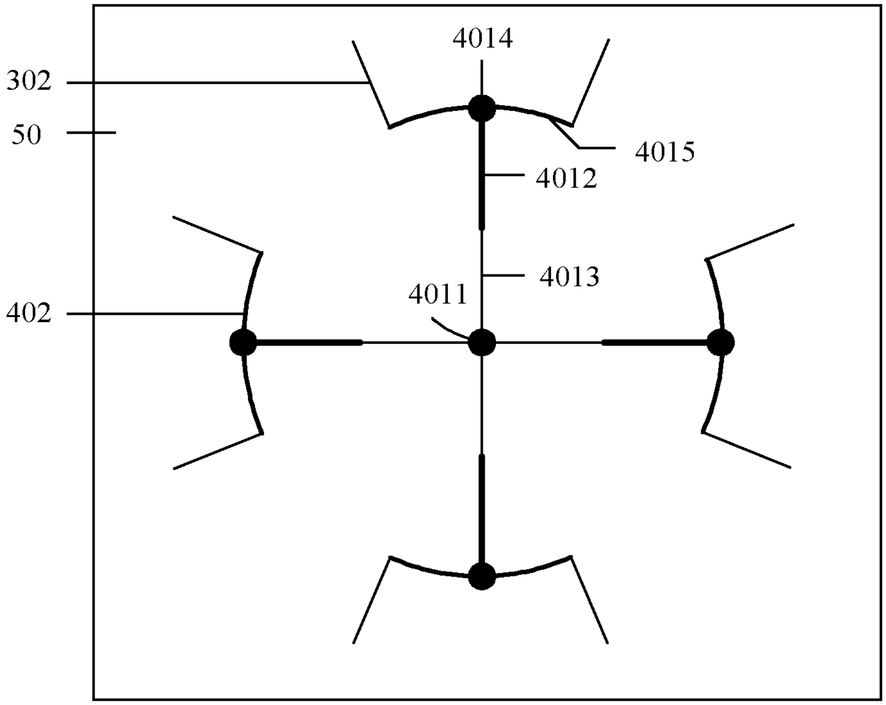
FIG. 9 is a schematic diagram of a structure of an upper surface of a PCB of an antenna assembly that includes a monopole element according to an embodiment of this disclosure.

For example, FIG. 9 is a schematic diagram of a structure of an antenna assembly that includes eight monopole elements. As shown in FIG. 9, the antenna assembly includes eight monopole elements 302, a strip line power division network 402 and a PCB 50. The eight monopole elements 302 are all located on an upper surface of the PCB 50, and the strip line power division network 402 is also located on the upper surface of the PCB 50. Each monopole element 302 includes an arm. The strip line power division network 402 may include a first power splitter 4011, a plurality of linear strip lines 4012, a plurality of impedance transformation lines 4013, a second power splitter 4014, and a plurality of arc-shaped strip lines 4015. Since the antenna assembly includes the eight monopole elements 302, the first power splitter 4011 may be a one-to-four power splitter, quantities of the impedance transformation lines 4013 and the linear strip lines 4012 each may be 4, and a quantity of the arc-shaped strip lines 4015 is 8. The eight monopole elements may be linear, and the eight monopole elements point to an antenna phase center. In this case, other non-radial parts are not included in each monopole element. In addition, similarly, as shown in FIG. 9, in this embodiment of this disclosure, the first power splitter 4011 may be located at the antenna phase center, and a circumference corresponding to the feeding network may be determined by using a position of the first power splitter 4011 as a center of a circle. The arc-shaped strip lines 4015 may be distributed along the circumference. Connection points between the monopole elements and the arc-shaped strip lines may be located on the circumference, that is, N monopole elements are distributed on the circumference centering on the antenna phase center. The monopole elements 302 and the strip line power division network 402 are usually located on one side, for example, the upper surface, of the PCB 50. The other side of the PCB 50 may be provided with a base plate. The base plate may be circular or in any other shape. The base plate usually does not overlap with projections of the monopole elements 302.

Four output ports of the first power splitter 4011 are respectively connected to one ends of the four impedance transformation lines 4013, and the other ends of the four impedance transformation lines 4013 are respectively connected to one ends of the four linear strip lines 4012. The other end of each linear strip line 4012 is connected to one second power splitter 4014, and two output ports of the second power splitter 4014 are respectively connected to two arc-shaped strip lines 4015. In this way, after the first power splitter 4011 splits one current input to the feeding network into four currents, the first power splitter may output the four currents through the four output ports, and the four currents are respectively transmitted to four second power splitters 4014 through the four impedance transformation lines 4013 and the four linear strip lines 4012 connected to the four impedance transformation lines 4013. Each second power splitter 4014 may split a received current into two currents and output the two currents through two output ports, and the two currents are respectively transmitted to two adjacent monopole elements 302 through two arc-shaped strip lines 4015, to feed the two adjacent monopole elements 302. The impedance transformation lines 4013 may be quarter-wave impedance transformation lines 4013, and the linear strip lines 4012 and the arc-shaped strip lines 4015 may be 50 ohm strip lines.

When N is an even number, the N monopole elements 302 may also be divided into N/2 element pairs, and the two monopole elements in each element pair are centrosymmetrical with each other with respect to the antenna phase center. In this way, the two elements in the element pair may be equivalent to a point source with an amplitude of 1 and a phase of 0, and correspondingly, a function of radiation intensity changing with a radiation angle θ may also be expressed by the formula (1). Therefore, a distance between the two monopole elements in a monopole element pair is adjusted, so that radiation intensity of the monopole element pair at different radiation angles may be adjusted, to further adjust a side lobe suppression capability of the antenna assembly. That is, in this embodiment of this disclosure, a distance between the two monopole elements in each monopole element pair that is included in the antenna assembly may be set based on a radiation angle of the monopole element pair and a required side lobe suppression capability.

In FIG. 9, an implementation of the antenna assembly that includes eight monopole elements is mainly described. For an implementation of the antenna assembly when N is another even number, refer to the implementation in which N is 8. Different from the implementation in which N is 8, the first power splitter 4011 in the strip line power division network is different depending on a quantity of monopole elements, and quantities of the impedance transformation lines 4013 and the strip lines are different. Specifically, refer to the foregoing related description of the feeding network of the antenna assembly that includes an even number of dipole elements. Details are not described herein again in this embodiment of this disclosure.

Optionally, for an implementation of the antenna assembly when N is an odd number, refer to a related implementation in which an odd number of dipole elements are included in the foregoing embodiment. Details are not described herein again in this embodiment of this disclosure.

Optionally, in some possible implementations, each monopole element 302 may not be linear, for example, each monopole element 302 may be L-shaped. In this case, each monopole element 302 may include a radial part pointing to the antenna phase center and a non-radial part not pointing to the antenna phase center, where a length of the radial part is greater than that of the non-radial part. Certainly, each monopole element 302 may alternatively be in another shape provided that the length of the radial part pointing to the antenna phase center is greater than that of other non-radial parts.

In this embodiment of this disclosure, N elements and the feeding network are located on the PCB, the N elements are all connected to the feeding network, each element has a radial part, the radial part of each element points to an antenna phase center, and a length of the radial part of each element is greater than a sum of lengths of other non-radial parts. In this way, radiation intensity of an electromagnetic field, of each element, in a direction in which the radial part is located is greater than radiation intensity on a non-radial part, that is, a main radiation direction of each element is consistent with the direction in which the radial part is located. Therefore, each element is equivalent to a line source, and has a relatively narrow beamwidth and an enhanced side lobe suppression capability. In this case, signal interference is reduced for two adjacent wireless APs operating at a same frequency. In addition, when N is an even number, N dipole elements may be divided into a plurality of dipole element pairs, and the two elements in each element pair are centrosymmetrical with each other with respect to the antenna phase center. In this way, when the antenna assembly is designed, a distance between two elements may be set based on a use scenario, so that radiation intensity of the antenna assembly at different radiation angles is adjusted, to further adjust a side lobe suppression capability of the antenna assembly.

In FIG. 9, an implementation in which the elements in the antenna assembly are monopole elements is described. Optionally, in this embodiment of this disclosure, the N elements included in the antenna assembly may alternatively be slot elements. In this case, the feeding network may be a strip line power division network. In the antenna assembly, the N slot elements are located on the upper surface of the PCB and the strip line power division network is located on the lower surface of the PCB. This is different from a structure of the antenna assembly that includes monopole elements.

Figure 10:
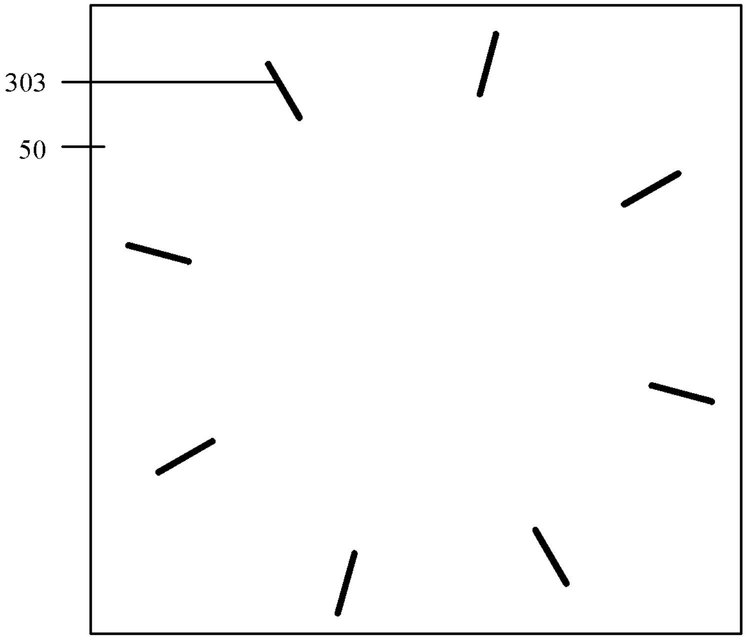
FIG. 10 is a schematic diagram of a structure of an upper surface of a PCB of an antenna assembly that includes a slot element according to an embodiment of this disclosure.
Figure 11:
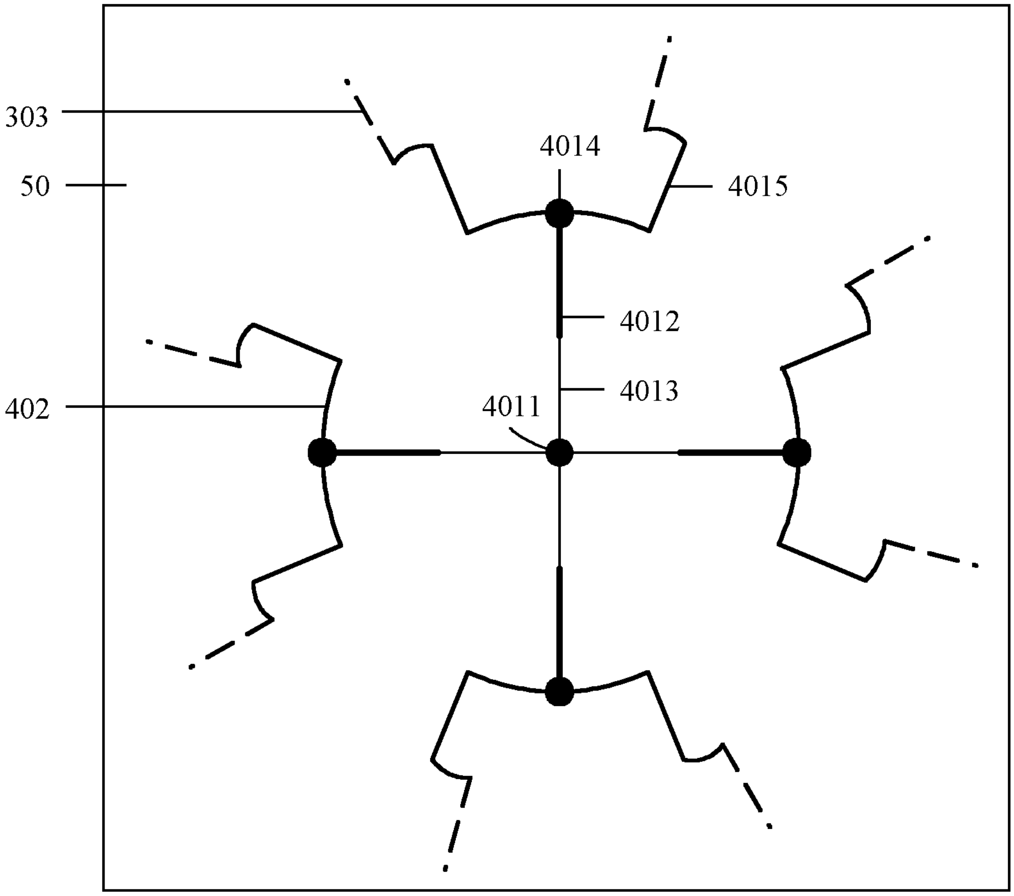
FIG. 11 is a schematic diagram of a structure of a lower surface of a PCB of an antenna assembly that includes a slot element according to an embodiment of this disclosure.

For example, FIG. 10 is a schematic diagram of a structure of an upper surface of a PCB of an antenna assembly that includes eight slot elements. As shown in FIG. 10, the eight slot elements 303 refer to eight slots cut on the upper surface of the PCB 50, and each slot is a slot element. Each slot element 303 may be linear, and each slot element 303 points to an antenna phase center. That is, each slot element 303 does not include a non-radial part. FIG. 11 is a schematic diagram of a lower surface of the PCB 50 of the antenna assembly. As shown in FIG. 11, a strip line power division network 402 is disposed on the lower surface of the PCB 50. The strip line power division network 402 may include a first power splitter 4011, a plurality of linear strip lines 4012, a plurality of impedance transformation lines 4013, a second power splitter 4014, and a plurality of arc-form strip lines 4016. Since the antenna assembly includes eight slot elements, the first power splitter 4011 may be a one-to-four power splitter, quantities of the impedance transformation lines 4013 and the linear strip lines 4012 each may be 4, and a quantity of the arc-form strip lines 4016 is 8. Each arc-form strip line 4016 may be an approximately L-shaped strip line obtained by connecting a section of linear strip line 4012 to a section of arc-shaped strip line, may be an arc-shaped strip line, or may be an L-shaped strip line obtained by connecting two linear strip lines 4012. Details are not described herein again in this embodiment of this disclosure. In FIG. 10, that each arc-form strip line 4016 is an approximately L-shaped strip line obtained by connecting a section of linear strip line to a section of arc-shaped strip line is used as an example for description.

Four output ports of the first power splitter 4011 are respectively connected to one ends of four impedance transformation lines 4013, and the other ends of the four impedance transformation lines 4013 are respectively connected to one ends of four linear strip lines 4012. The other end of each linear strip line 4012 is connected to one second power splitter 4014, and two output ports of the second power splitter 4014 are respectively connected to two arc-form strip lines 4016. In this way, after the first power splitter 4011 splits one current input to the feeding network into four currents, the first power splitter may output the four currents through the four output ports, and the four currents are respectively transmitted to four second power splitters 4014 through the four impedance transformation lines 4013 and the four linear strip lines 4012 connected to the four impedance transformation lines 4013. Each second power splitter 4014 may split a received current into two currents and output the two currents through two output ports, and the two currents are respectively transmitted to two adjacent slot elements 303 through two arc-form strip lines 4016, to feed the two adjacent slot elements 303. The impedance transformation lines 4013 may be quarter-wave impedance transformation lines 4013, and the linear strip lines 4012 and the arc-shaped strip lines 4016 may be 50 ohm strip lines. This is not limited in this embodiment of this disclosure.

In addition, the upper surface of the PCB 50 may be a copper plate, the N slot elements 303 cut on the copper plate, and each slot intersects with an arc-form strip line 4016 on the lower surface of the PCB 50, so that each slot element 303 is connected to the arc-form strip line 4016.

Similarly, in this embodiment of this disclosure, when N is an even number, the N slot elements 303 may be divided into N/2 element pairs, and the two slot elements 303 in each element pair are centrosymmetrical with each other with respect to the antenna phase center. In this way, a distance between the two slot elements 303 in an element pair may be set, to adjust radiation intensity of the slot elements 303 at different radiation angles, to further adjust a side lobe suppression capability of the antenna assembly.

Optionally, for an implementation of the antenna assembly when N is another even number, refer to the implementation in which N is 8. Different from the implementation in which N is 8, the first power splitter 4011 included in the strip line power division network 402 is different depending on a quantity of slot elements, and quantities of the impedance transformation lines 4013 and the strip lines are different. Specifically, refer to the foregoing related description of the feeding network of the antenna assembly that includes an even number of dipole elements. Details are not described herein again in this embodiment of this disclosure.

Optionally, for an implementation of the antenna assembly when N is an odd number, refer to a related implementation in which an odd number of dipole elements are included in the foregoing embodiment. Details are not described herein again in this embodiment of this disclosure.

In addition, in some possible implementations, each slot element 303 may not be linear, for example, each slot element 303 may be L-shaped. For a specific implementation in which each slot element 303 is not linear, refer to the foregoing related implementation in which the monopole element is not linear. Details are not described herein again in this embodiment of this disclosure.

In this embodiment of this disclosure, the N elements and the feeding network are located on the PCB, the N elements are all connected to the feeding network, each element has a radial part, the radial part of each element points to the antenna phase center, and a length of the radial part of each element is greater than a sum of lengths of other non-radial parts. In this way, radiation intensity of an electromagnetic field, of each element, in a direction in which the radial part is located is greater than radiation intensity on a non-radial part, that is, a main radiation direction of each element is consistent with the direction in which the radial part is located. Therefore, each element is equivalent to a line source, and has a relatively narrow beamwidth and an enhanced side lobe suppression capability. In this case, signal interference is reduced for two adjacent wireless APs operating at a same frequency. In addition, when N is an even number, N dipole elements may be divided into a plurality of dipole element pairs, and the two elements in each element pair are centrosymmetrical with each other with respect to the antenna phase center. In this way, when the antenna assembly is designed, a distance between two elements may be set based on a use scenario, so that radiation intensity of the antenna assembly at different radiation angles is adjusted, to further adjust a side lobe suppression capability of the antenna assembly.

What is claimed is:

1. An antenna assembly, comprising:
a printed circuit board (PCB);
a feeding network located on the PCB and comprising a plurality of arc-shaped strip lines; and
N elements on the PCB,
wherein N is an integer greater than or equal to 3,
wherein all of the N elements are coupled to the feeding network,
wherein each of the N elements has a radial part,
wherein the radial part of each element points to an antenna phase center,
wherein for each element, a length of the radial part is greater than a sum of lengths of other non-radial parts,
wherein the feeding network is a double-sided parallel strip line power division network,
wherein the N elements are N dipole elements,
wherein each dipole element comprises two arms,
wherein a first one of the two arms is located on an upper surface of the PCB and is coupled to one end of a first arc-shaped strip line of the plurality of arc-shaped strip lines that is located on the upper surface of the PCB and that is in the double-sided parallel strip line power division network,
wherein a second one of the two arms is located on a lower surface of the PCB and is coupled to one end of a second arc-shaped strip line of the plurality of arc-shaped strip lines that is located on the lower surface of the PCB and that is in the double-sided parallel strip line power division network,
wherein the first arc-shaped strip line and the second arc-shaped strip line are mirror-symmetrical with each other with respect to the PCB, and
wherein connection points between the first arc-shaped strip line and the second arc-shaped strip line are mirror-symmetrical with each other with respect to the PCB.

2. The antenna assembly of claim 1, wherein N is an even number, wherein a plurality of element pairs is in the N elements, and wherein the elements in each element pair are centrosymmetrical with each other with respect to the antenna phase center.

3. The antenna assembly of claim 1, wherein the double-sided parallel strip line power division network comprises an upper surface network and a lower surface network, wherein the upper surface network is located on the upper surface, wherein the lower surface network is located on the lower surface, wherein the upper surface network and the lower surface network are mirror-symmetrical with each other with respect to the PCB, wherein each of the upper surface network and the lower surface network comprises a first power splitter, a plurality of linear strip lines, a plurality of impedance transformation lines, a second power splitter, and a portion of the plurality of arc-shaped strip lines, wherein the first power splitter is configured to couple the linear strip lines and the arc-shaped strip lines, wherein each of the linear strip lines is coupled to one of the impedance transformation lines, and wherein the second power splitter is configured to couple the impedance transformation lines.

4. The antenna assembly of claim 1, wherein the two arms comprise a first arm and a second arm, wherein the first arm comprises a non-radial part and is L-shaped, wherein the second arm does not comprise any non-radial part, and wherein a first distance between the first arm and the antenna phase center is greater than a second distance between the second arm and the antenna phase center.

5. The antenna assembly of claim 1, wherein the N dipole elements comprise a first dipole element and a second dipole element that are centrosymmetrical with each other, wherein a first distance between the first dipole element and the second dipole element is between a first connection point and a second connection point, wherein the first connection point is between the first dipole element and the first arc-shaped strip line, and wherein the second connection point is between the second dipole element and the second arc-shaped strip line.

6. The antenna assembly of claim 1, wherein each of the plurality of arc-shaped strip lines comprise an arc-shaped tail end.

7. The antenna assembly of claim 1, wherein a length of each arm is a multiple of an operating wavelength of the antenna assembly, and wherein the multiple is a value from 0.125 to 1.

8. A wireless device, comprising:
a radio frequency circuit configured to implement transmission and reception of a radio signal; and
an antenna assembly coupled to the radio frequency circuit and configured to implement the transmission and the reception of the radio signal with the radio frequency circuit, wherein the antenna assembly comprises:
a printed circuit board (PCB);
a feeding network located on the PCB and comprising a plurality of arc-shaped strip lines; and
N elements on the PCB,
wherein N is an integer greater than or equal to 3,
wherein all of the N elements are coupled to the feeding network,
wherein each of the N elements has a radial part,
wherein the radial part points to an antenna phase center,
wherein for each element, a length of the radial part is greater than a sum of lengths of other non-radial parts,
wherein the feeding network is a double-sided parallel strip line power division network,
wherein the N elements are N dipole elements,
wherein each dipole element comprises two arms,
wherein a first one of the two arms is located on an upper surface of the PCB and is coupled to one end of a first arc-shaped strip line of the plurality of arc-shaped strip lines that is located on the upper surface of the PCB and that is in the double-sided parallel strip line power division network,
wherein a second one of the two arms is located on a lower surface of the PCB and is coupled to one end of a second arc-shaped strip line of the plurality of arc-shaped strip lines that is located on the lower surface of the PCB and that is in the double-sided parallel strip line power division network,
wherein the first arc-shaped strip line and the second arc-shaped strip line are mirror-symmetrical with each other with respect to the PCB, and
wherein connection points between the first arc-shaped strip line and the second arc-shaped strip line are mirror-symmetrical with each other with respect to the PCB.

9. The wireless device of claim 8, wherein N is an even number, wherein a plurality of element pairs is in the N elements, and wherein the elements in each element pair are centrosymmetrical with each other with respect to the antenna phase center.

10. The wireless device of claim 8, wherein the double-sided parallel strip line power division network comprises an upper surface network and a lower surface network, wherein the upper surface network is located on the upper surface, wherein the lower surface network is located on the lower surface, wherein the upper surface network and the lower surface network are mirror-symmetrical with each other with respect to the PCB, wherein each of the upper surface network and the lower surface network comprises a first power splitter, a plurality of linear strip lines, a plurality of impedance transformation lines, a second power splitter, and a portion of the plurality of arc-shaped strip lines, wherein the first power splitter is configured to couple the linear strip lines and the arc-shaped strip lines, wherein each of the linear strip lines is coupled to one of the impedance transformation lines, and wherein the second power splitter is configured to couple the impedance transformation lines.

11. The wireless device of claim 8, wherein the two arms comprise a first arm and a second arm, wherein the first arm comprises a non-radial part and is L-shaped, wherein the second arm does not comprise any non-radial part, and wherein a first distance between the first arm and the antenna phase center is greater than a second distance between the second arm and the antenna phase center.

12. The wireless device of claim 8, wherein the N dipole elements comprise a first dipole element and a second dipole element that are centrosymmetrical with each other, wherein a first distance between the first dipole element and the second dipole element is between a first connection point and a second connection point, wherein the first connection point is between the first dipole element and the first arc-shaped strip line, and wherein the second connection point is between the second dipole element and the second arc-shaped strip line.

13. The wireless device of claim 8, wherein each of the plurality of arc-shaped strip lines comprise an arc-shaped tail end.

14. The wireless device of claim 8, wherein a length of each arm is a multiple of an operating wavelength of the antenna assembly, and wherein the multiple is a value from 0.125 to 1.

15. An apparatus, comprising:
- a feeding network comprising a plurality of arc-shaped strip lines; and
- N elements,
- wherein N is an integer greater than or equal to 3,
- wherein all of the N elements are coupled to the feeding network,
- wherein each of the N elements has a radial part,
- wherein the radial part of each element points to an antenna phase center,
- wherein for each element, a length of the radial part is greater than a sum of lengths of other non-radial parts,
- wherein the feeding network is a double-sided parallel strip line power division network,
- wherein the N elements are N dipole elements,
- wherein each dipole element comprises two arms,
- wherein a first one of the two arms is coupled to one end of a first arc-shaped strip line of the plurality of arc-shaped strip lines that is in the double-sided parallel strip line power division network,
- wherein a second one of the two arms is coupled to one end of a second arc-shaped strip line of the plurality of arc-shaped strip lines that is in the double-sided parallel strip line power division network,
- wherein the first arc-shaped strip line and the second arc-shaped strip line are mirror-symmetrical with each other, and
- wherein connection points between the first arc-shaped strip line and the second arc-shaped strip line are mirror-symmetrical with each other.

16. The apparatus of claim 15, wherein N is an even number, wherein a plurality of element pairs is in the N elements, and wherein the elements in each element pair are centrosymmetrical with each other with respect to the antenna phase center.

17. The apparatus of claim 15, wherein the double-sided parallel strip line power division network comprises an upper surface network and a lower surface network, wherein the upper surface network is located on the upper surface, wherein the lower surface network is located on the lower surface, wherein the upper surface network and the lower surface network are mirror-symmetrical with each other, wherein each of the upper surface network and the lower surface network comprises a first power splitter, a plurality of linear strip lines, a plurality of impedance transformation lines, a second power splitter, and a portion of the plurality of arc-shaped strip lines, wherein the first power splitter is configured to couple the linear strip lines and the arc-shaped strip lines, wherein each of the linear strip lines is coupled to one of the impedance transformation lines, and wherein the second power splitter is configured to couple the impedance transformation lines.

18. The apparatus of claim 15, wherein the two arms comprise a first arm and a second arm, wherein the first arm comprises a non-radial part and is L-shaped, wherein the second arm does not comprise any non-radial part, and wherein a first distance between the first arm and the antenna phase center is greater than a second distance between the second arm and the antenna phase center.

19. The apparatus of claim 15, wherein each of the plurality of arc-shaped strip lines comprise an arc-shaped tail end.

20. The apparatus of claim 15, wherein a length of each arm is a multiple of an operating wavelength of an antenna assembly of the apparatus, and wherein the multiple is a value from 0.125 to 1.

* * * * *